(12) United States Patent
Brokaw

(10) Patent No.: US 11,737,401 B2
(45) Date of Patent: Aug. 29, 2023

(54) STUMP GRINDER WITH HELICAL ROTARY ACTUATOR

(71) Applicant: Alamo Group Inc., Seguin, TX (US)

(72) Inventor: Seth W. Brokaw, Polk, OH (US)

(73) Assignee: Alamo Group Inc., Seguin, TX (US)

( * ) Notice: Subject to any disclaimer, the term of this patent is extended or adjusted under 35 U.S.C. 154(b) by 0 days.

(21) Appl. No.: 17/495,502

(22) Filed: Oct. 6, 2021

(65) Prior Publication Data

US 2022/0104440 A1    Apr. 7, 2022

Related U.S. Application Data

(60) Provisional application No. 63/088,183, filed on Oct. 6, 2020.

(51) Int. Cl.
*A01G 23/06*    (2006.01)

(52) U.S. Cl.
CPC .................... *A01G 23/067* (2013.01)

(58) Field of Classification Search
CPC .............................. A01G 23/06; A01G 23/067
See application file for complete search history.

(56) References Cited

U.S. PATENT DOCUMENTS

| | | |
|---|---|---|
| 3,198,224 A | 8/1965 | Hiley |
| 3,307,643 A | 3/1967 | Ferri |
| 3,911,979 A | 10/1975 | Rousseau |
| 5,655,581 A * | 8/1997 | Craft .................... A01G 23/067 180/53.3 |
| 5,709,254 A | 1/1998 | Argue |
| 7,007,414 B2 | 3/2006 | Paumier |
| 7,150,300 B1 | 12/2006 | Peterson |
| 9,790,967 B2 | 10/2017 | Schmotter |
| 10,039,239 B2 | 8/2018 | Brand et al. |
| 10,231,389 B2 | 3/2019 | Kappel et al. |
| 2010/0314001 A1 | 12/2010 | Kappel et al. |
| 2015/0089819 A1 | 4/2015 | Schmotter |
| 2019/0133057 A1 * | 5/2019 | Barreto ................ A01G 23/067 |
| 2021/0321579 A1 * | 10/2021 | Pfoltner .............. A01G 23/067 |

FOREIGN PATENT DOCUMENTS

EP    2 976 940 A1    1/2016

OTHER PUBLICATIONS

International Search Report and Written Opinion dated Jan. 21, 2022 in corresponding PCT Application No. PCT/US2021/053804 (11 pages).

* cited by examiner

*Primary Examiner* — Matthew Katcoff
(74) *Attorney, Agent, or Firm* — Pizarro Allen PC

(57) ABSTRACT

A stump grinder may include a machine body and a helical rotary actuator mounted to the machine body, wherein the helical rotary actuator includes a central axis. A support may be mounted to the helical rotary actuator, and an arm may be mounted to the support. A cutting wheel may be rotatably mounted to the arm, and a motor may be operable for driving the cutting wheel. The helical rotary actuator may be configured for moving the cutting wheel along an arcuate path about the central axis.

21 Claims, 8 Drawing Sheets

STUMP GRINDER WITH HELICAL ROTARY ACTUATOR

CROSS REFERENCE TO RELATED APPLICATIONS

This application claims priority to U.S. Provisional Patent Application No. 63/088,183 titled "Stump Grinder with Helical Rotary Actuator" filed Oct. 6, 2020. The full disclosure of the aforementioned patent application is herein fully incorporated by reference.

FIELD

This application relates generally to stump grinders.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

In general, stump grinders have a rotary cutting wheel mounted on an arm or "boom" that is mounted to a vehicle with a vertical pin such that the boom may swing from side to side about the vertical axis of the pin. One or more hydraulic cylinders are typically configured to raise and lower the boom, and additional hydraulic cylinders (one on each side of the boom) are typically configured as "push-pull actuators" to move the boom from side to side. The presence of the push-pull actuators between the boom and the vehicle limit the swing path of the cutting wheel due to geometric constraints. In light of that, to achieve a larger cutting width, the length of the boom must be increased, which negatively affects the weight distribution of the stump grinding machine. Typically, the actuator and frame apparatus that facilitates the attachment and articulation of the boom with respect to the vehicle contains a large number of parts that have to be fabricated and assembled as well as procured and stored, all of which generally must conform to tight tolerances for the system to be reliable and have adequate longevity. When the frame is welded to the vehicle, the heating and cooling from the welding process frequently contorts the frame and misaligns various critical points, such as boom and actuator pin locations. Such misalignment is very hard to avoid without costly and complex machining after the weldment cools.

The foregoing challenges can lead to unforeseen reliability issues over time. Even slight misalignment of the critical points can cause cylinder failures and undue stress and failures in the machine frame itself. There are many maintenance points that the customer must address on a regular basis or failures are almost certain to occur. The push-pull hydraulic cylinders that swing the boom from side to side are low to the ground and exposed to road debris while in tow, flying debris while in use, and ground hazards while in work transit, along with environmental corrosion. Additionally, the push-pull hydraulic cylinder design does not leave many options for boom mounting. The stacking of manufacturing tolerances in the push-pull hydraulic cylinder design can also lead to unstable and loose boom conditions even when new.

SUMMARY

A stump grinder may include a machine body and a helical rotary actuator mounted to the machine body, wherein the helical rotary actuator includes a central axis. A support may be mounted to the helical rotary actuator, and an arm may be mounted to the support. A cutting wheel may be rotatably mounted to the arm, and a motor may be operable for driving the cutting wheel. The helical rotary actuator may be configured for moving the cutting wheel along an arcuate path about the central axis in order to grind a stump or other wood material.

In some embodiments, the arm may be pinned to the support, and the stump grinder may further include a linear actuator pinned to the arm and the support, wherein the linear actuator is extendable and retractable for lowering and raising the arm.

In some embodiments, the motor may be mounted to the arm.

In some embodiments, the motor may be mounted to the machine body.

In some embodiments, the arm may be pivotable about the central axis in a range of motion comprising substantially 180 degrees.

In some embodiments, the arm may be pivotable about the central axis in a range of motion greater than 180 degrees.

In some embodiments, a stump grinder may include a machine body and a helical rotary actuator mounted adjacent to the machine body and including a central axis. The stump grinder may further include a support mounted to the helical rotary actuator, an arm mounted to the support, a cutting wheel rotatably mounted to the arm, and a motor operable for driving the cutting wheel. The helical rotary actuator may be configured for moving the cutting wheel along an arcuate path about the central axis.

In some embodiments, a stump grinder may include a machine body and a helical rotary actuator mounted adjacent the machine body, the helical rotary actuator including a central axis. The stump grinder may further include a support mounted to the helical rotary actuator, an arm mounted to the support, a cutting wheel rotatably mounted to the arm, and a motor operable for driving the cutting wheel. The arm may be pivotable about the central axis in a range of motion of at least about 150 degrees.

In some embodiments, a stump grinder may include a machine body including a chassis and a helical rotary actuator mounted to the machine body, the helical rotary actuator including a central axis, the helical rotary actuator being positioned above the chassis. The stump grinder may further include a support mounted to the helical rotary actuator, an arm mounted to the support, a cutting wheel rotatably mounted to the arm, and a motor operable for driving the cutting wheel. The helical rotary actuator may be configured for moving the cutting wheel along an arcuate path about the central axis.

DETAILED DESCRIPTION

Figure 1:
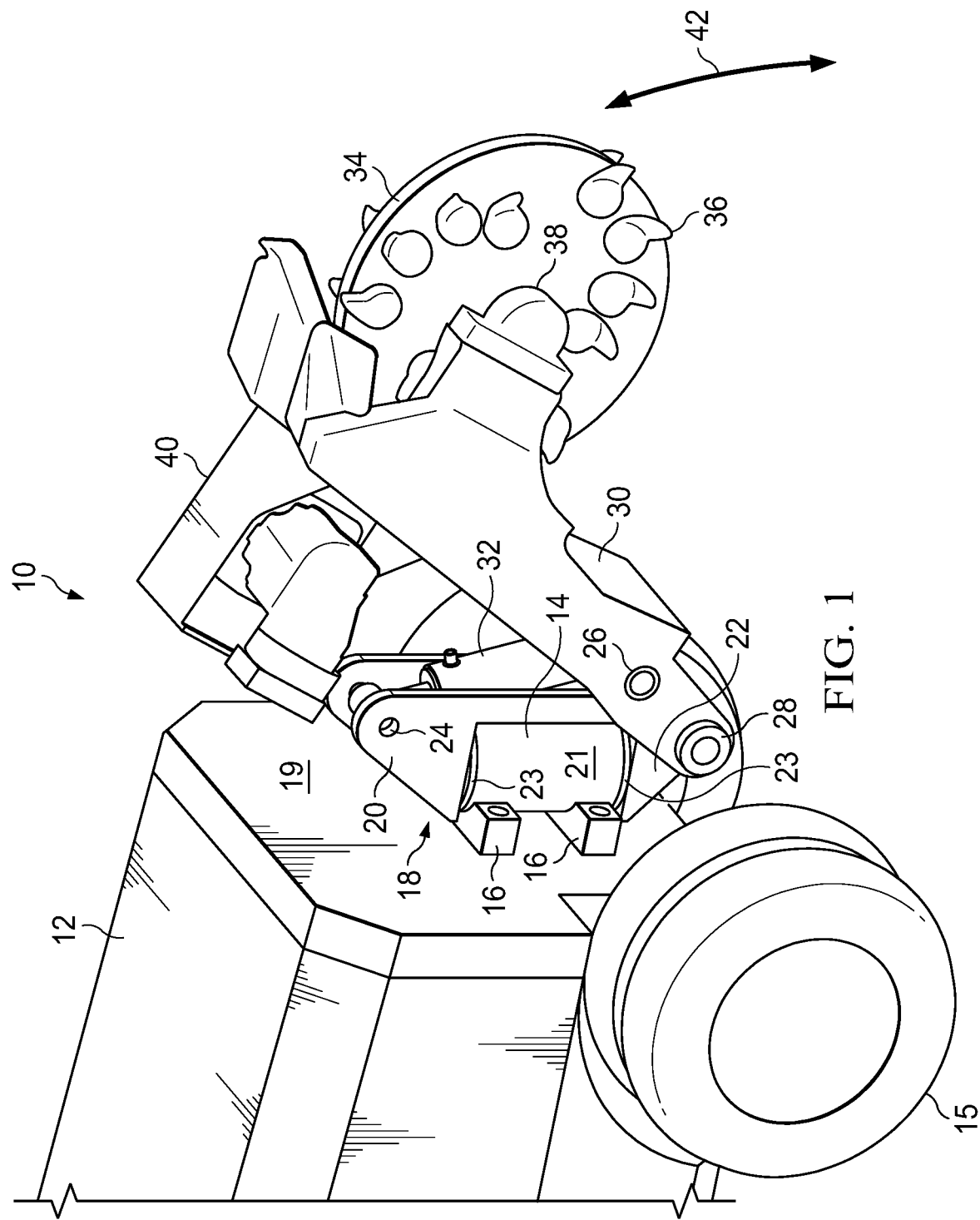
FIG. 1 is a perspective view of an embodiment of a stump grinder.

As used herein, the following terms should be understood to have the indicated meanings:

When an item is introduced by "a" or "an," it should be understood to mean one or more of that item.

"Comprises" means includes but is not limited to.

"Comprising" means including but not limited to.

"Having" means including but not limited to.

"Machine body" as used herein refers to the load bearing structure of the machine. For example, a machine body may include one or more walls, beams, columns, crossbars, trusses, girders, or other support structures. Also by way of example, where the machine is a vehicle, the "machine body" may include a vehicle chassis and other support structure connected thereto.

With reference to the stump grinders 10, 50, 60, shown in FIGS. 1-7, in some embodiments, a stump grinder 10, 50, 60 may include a cutting wheel 34 rotatably mounted to an arm 30 via an axle 38, for example. Cutting wheel 34 may have a plurality of teeth 36 or other cutting tools configured for grinding tree stumps or other wood material as cutting wheel 34 is rotated. A motor 40 may be mounted to arm 30 and operable for rotating cutting wheel 34. Alternatively, in some embodiments, cutting wheel 34 may be driven by a motor that is included in or on a machine body 12 to which arm 30 is mounted. The motor may be any suitable type of motor, such as electric, hydraulic, internal combustion, or the like. In some embodiments, machine body 12 may be a wheeled vehicle having a plurality of wheels 15 or other means of mobility, such as tracks, for example. Alternatively, some embodiments may not have any means of mobility in and of themselves but may be mounted to a truck or trailer, for example.

Arm 30 may be mounted to a support 18 that is mounted to a helical rotary actuator 14. For example, in some embodiments, helical rotary actuator 14 may be a model SRB115 actuator available from SungJi Hydraulics Co., Ltd. (Changwon-Si, South Korea). A helical rotary actuator 14 may comprise a cylinder body 21 and one or more actuator heads 23, sometimes referred to as piston sleeves. For example, a pair of actuator heads 23 may be rotatably connected to the cylinder body 21. In stump grinder 10, FIGS. 1-4 show a top member of a pair of actuator heads 23 connected to an upper portion 20 of the support 18 using one or more lugs 25. Of course, other suitable connectors may be used in place of lugs 25. For example, the actuator heads 23 may be connected to the support 18 using bolts, screws, or another suitable type of connector. In some embodiments, the actuator heads 23 may be fixed to the support 18 using a weldment. A bottom member of the pair of actuator heads 23 may be similarly connected to a lower portion 22 of the support 18. The cylinder body 21 may provide a protective housing for protecting internal components of the helical rotary actuator 14 (e.g., a central shaft, annular piston, and bearings), the internal components being configured for rotation of the one or more actuator heads 23 with respect to the cylinder body 21 about axis A-A when actuated. Support 18 may be attached to the helical rotary actuator 14 via the actuator heads 23 so that it may rotate about axis A-A upon actuation of helical rotary actuator 14.

Figure 8A:
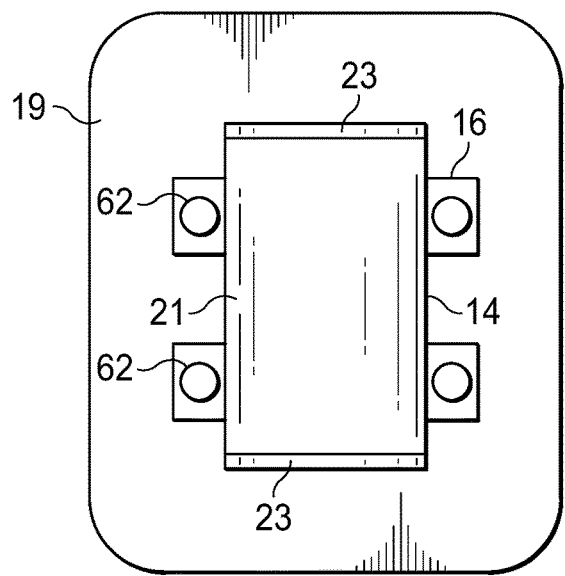
FIG. 8A shows an embodiment of a helical rotary actuator mounted to a machine body using a wall.
Figure 8B:
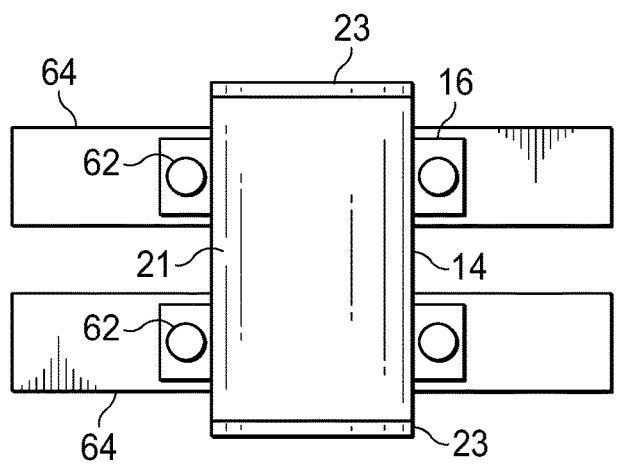
FIG. 8B shows an embodiment of a helical rotary actuator mounted to a machine body using a cross bar.
Figure 8C:
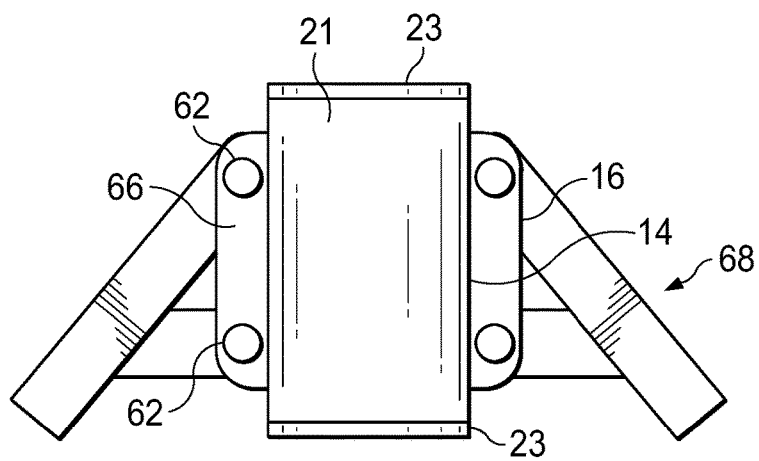
FIG. 8C shows an embodiment of a helical rotary actuator mounted to a machine body using a truss.

Helical rotary actuator 14 may be mounted to machine body 12 in any suitable manner, such as by using one or more mounts 16 and a plurality of bolts and nuts, for example, or by welding or other suitable means of attachment. For example, as shown in FIGS. 8A-8C, one or more mounts 16 may be used to connect the cylinder body 21 of helical rotary actuator 14 with the machine body 12. The mounts 16 may include one or more mounting holes 62 used to secure the helical rotary actuator 14 to the machine body 12 using one or more bolted connections, for example. In some embodiments, as shown in FIG. 8A, helical rotary actuator 14 may be connected to a wall 19 of the machine body 12 using a mount 16 in the shape of an arm or a bracket. As shown in FIG. 8B, helical rotary actuator 14 may be connected to one or more cross bars 64 of a machine body 12. As shown in FIG. 8C, a mount 16 may comprise a plate 66. The plate 66 may be mounted to a truss 68 of the machine body 12. Thus, the central body 21 of helical rotary actuator 14 may be held or anchored to the machine body 12 via plate 66. In some embodiments, a mount 16 may include one or more support brackets, arms, or plates, or other suitable structure for securely connecting helical rotary actuator 14 to machine body 12. In some embodiments, helical rotary actuator 14 may include a boss with one or more openings for receiving one or more screws or bolts to secure the helical rotary actuator 14 to the machine body 12.

Helical rotary actuator 14 may be activated to rotate support 18 about the central axis A-A of helical rotary actuator 14 in clockwise or counterclockwise directions such that arm 30 and cutting wheel 34 may swing in an arc 44 (see FIG. 4) about central axis A-A to facilitate grinding of a stump or other wood material. In some embodiments, the swing range of arm 30 and cutting wheel 34 may be about 180 degrees (e.g., plus or minus 90 degrees on each side of the centered position shown in FIG. 4), or even more than 180 degrees (e.g., more than plus or minus 90 degrees on each side of the centered position shown in FIG. 4). As illustrated, central axis A-A may be oriented substantially vertical in some embodiments, but it should be understood that helical rotary actuator 14 may be mounted in any suitable orientation, and central axis A-A may or may not be oriented substantially vertical.

Figure 2:
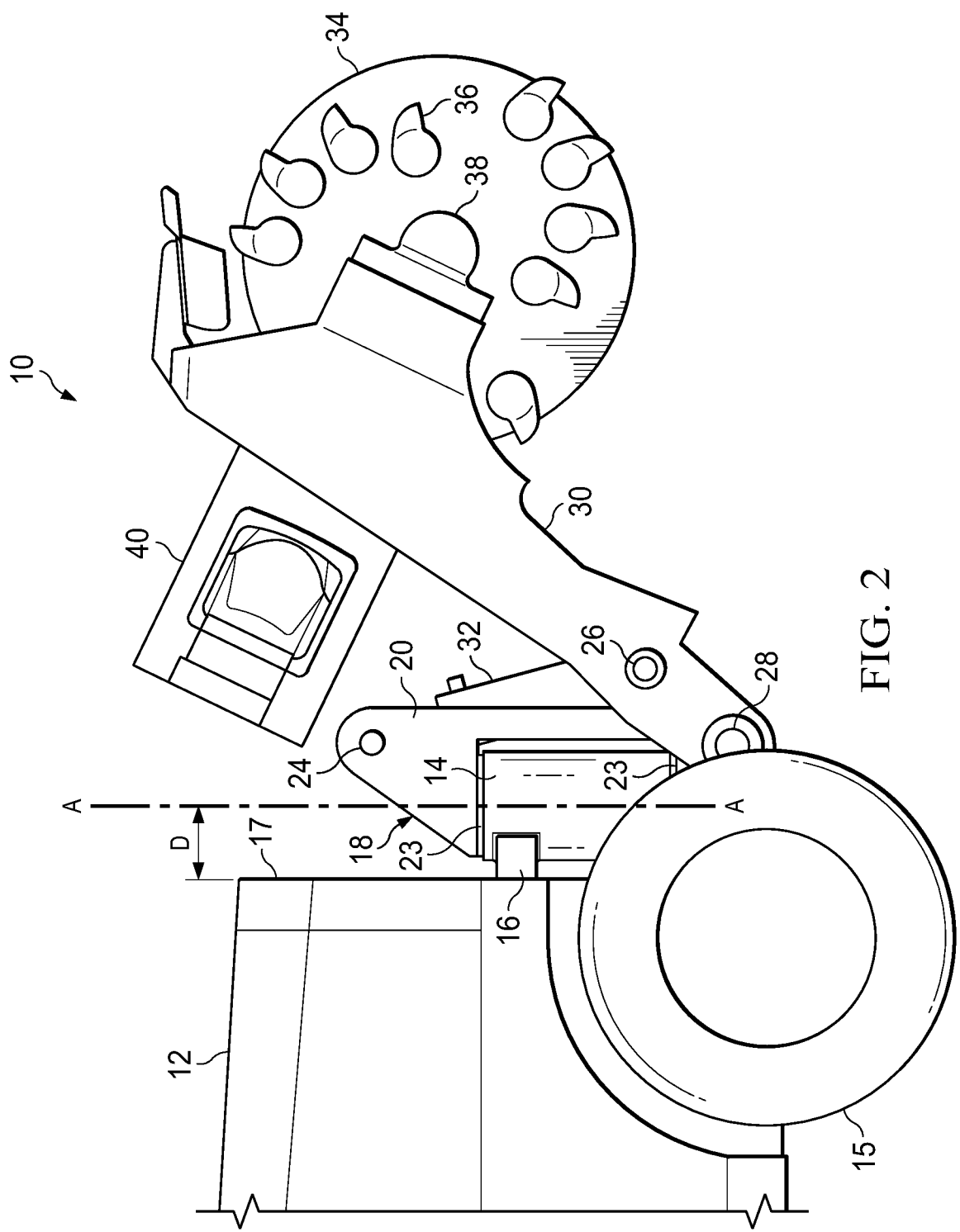
FIG. 2 is a right side elevational view of the stump grinder of FIG. 1.
Figure 3:
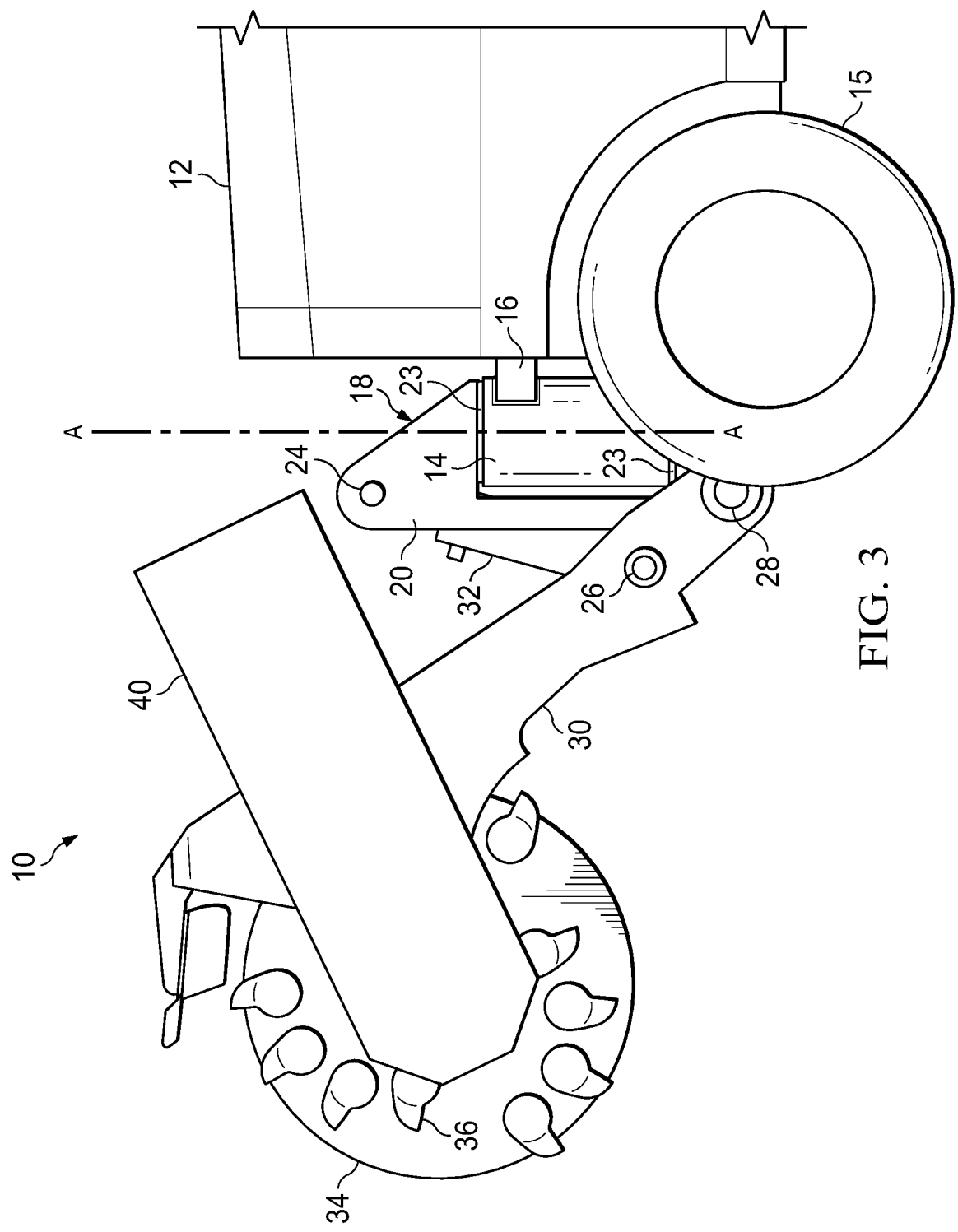
FIG. 3 is a left side elevational view of the stump grinder of FIG. 1.
Figure 4:
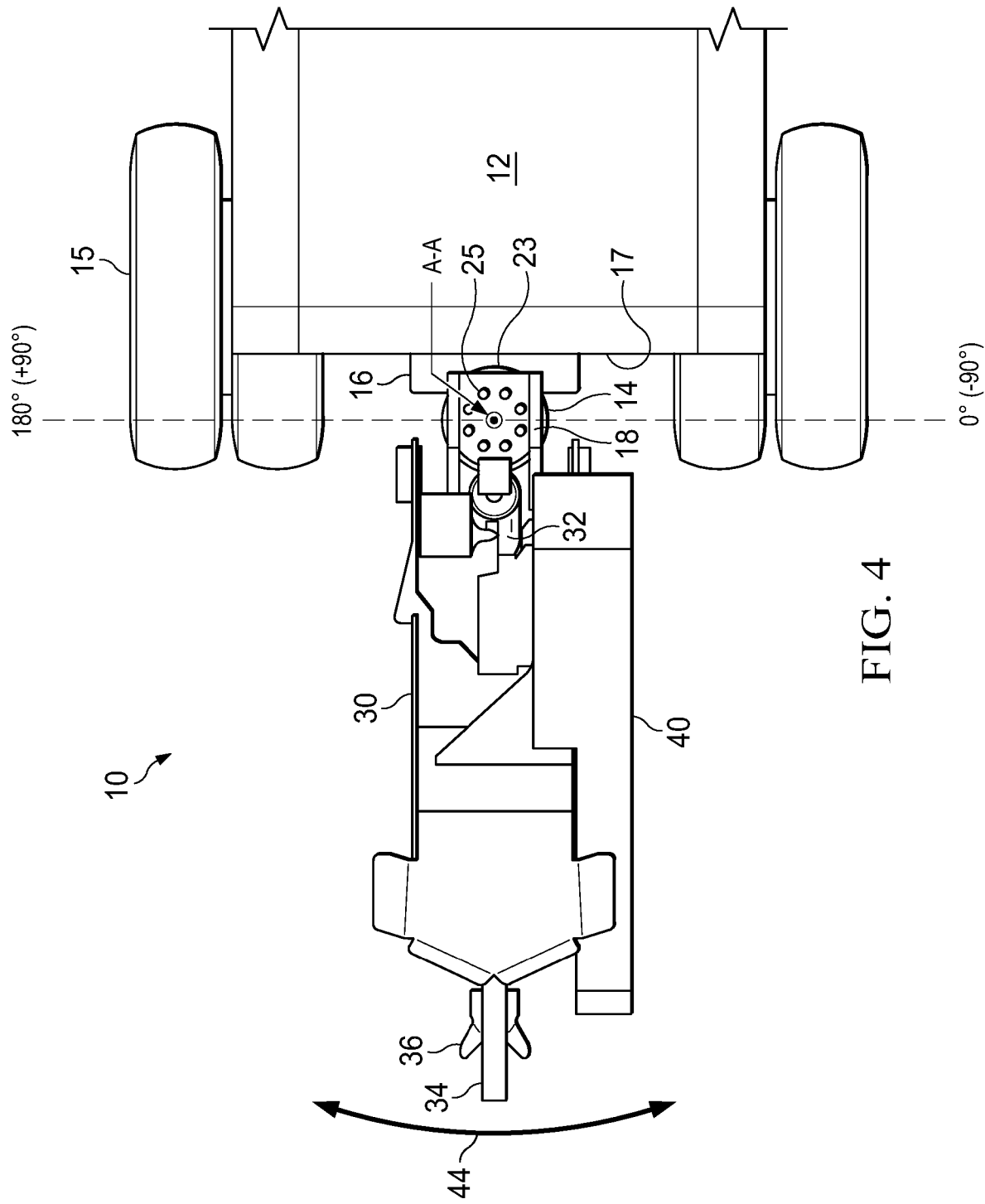
FIG. 4 is a top plan view of the stump grinder of FIG. 1.

In some embodiments, helical rotary actuator 14 may be directly mounted to the machine body 12. For example, as shown in FIGS. 1-4, helical rotary actuator 14 may be mounted to the machine body 12 using a suitably supported outward facing wall 19. In some embodiments, helical rotary actuator 14 may be mounted to a support beam, a cross bar, a truss, a wall, or a combination thereof. The central axis A-A may be positioned adjacent the machine body 12 to which it is mounted. For example, in some embodiments, as shown in FIG. 2, the central axis A-A may be offset a minimal distance (D) from a forward or rearward boundary 17 of the machine body 12, depending upon the machine design (e.g., whether the cutting wheel 34 is positioned in the front or back of the machine). Arm 30 may likewise be positioned close to the machine body 12. The rotational axis A-A may thus be located much more proximate to the machine body 12 than would be the case with push-pull actuators, which may extend a substantial distance away from their mounting points so as to enable a swing arm and grinding means mounted thereto to traverse a desired arc width. Some embodiments including a helical rotary actuator 14 may be particularly useful for providing an extended swing path in stump grinders with improved weight distribution and shorter booms than those of stump grinders using push-pull actuators. Such embodiments may be ideally suited for stump grinding operations wherein a compact and rugged design is advantageous.

For example, in some embodiments, arm 30 may be no more than about 1 foot to about 5 feet in length, and distance D may be about 2 inches to about 12 inches. The helical rotary actuator 14 may be positioned close to the machine body 12 so that the cutting wheel 34 extends a minimal distance from the machine body 12 when deployed in operation. For example, helical rotary actuator 14 may be positioned at or just beyond a forward boundary 17 (e.g., wall 19) of the machine body 12. With central axis A-A of helical rotary actuator 14 located forward of machine body 12, arm 30 may swing over an extended range without being impeded by the machine body 12 or other nearby structure. For example, in some embodiments, the swing range of arm 30 may be at least about 120 degrees, at least about 150 degrees, or at least about 180 degrees.

Arm 30 may be mounted to support 18 in such a manner to permit raising and lowering of arm 30 and hence cutting wheel 34. For example, arm 30 may be connected to support 18 using a joint. For example, arm 30 may be pinned to a lower portion 22 of support 18 with a pin 28, and a linear actuator 32 (such as a hydraulic or pneumatic actuator with a piston and a cylinder, for example) may be pinned to arm 30 and an upper portion 20 of support 18 with pins 26 and 24, respectively. As shown in FIGS. 1-3 and 5-7, upper portion 20 of support 18 may be disposed at an elevation higher than helical rotary actuator 14, and lower portion 22 of support 18 may be disposed at an elevation lower than helical rotary actuator 14. For example, at least some of upper portion 20 of support 18 may be disposed above helical rotary actuator 14, and at least some of lower portion 22 of support 18 may be disposed below helical rotary actuator 14. As linear actuator 32 is retracted, arm 30 and cutting wheel 34 may be raised, and as linear actuator 32 is extended, arm 30 and cutting wheel 34 may be lowered, as indicated by arrows 42 in FIG. 1.

Figure 5:
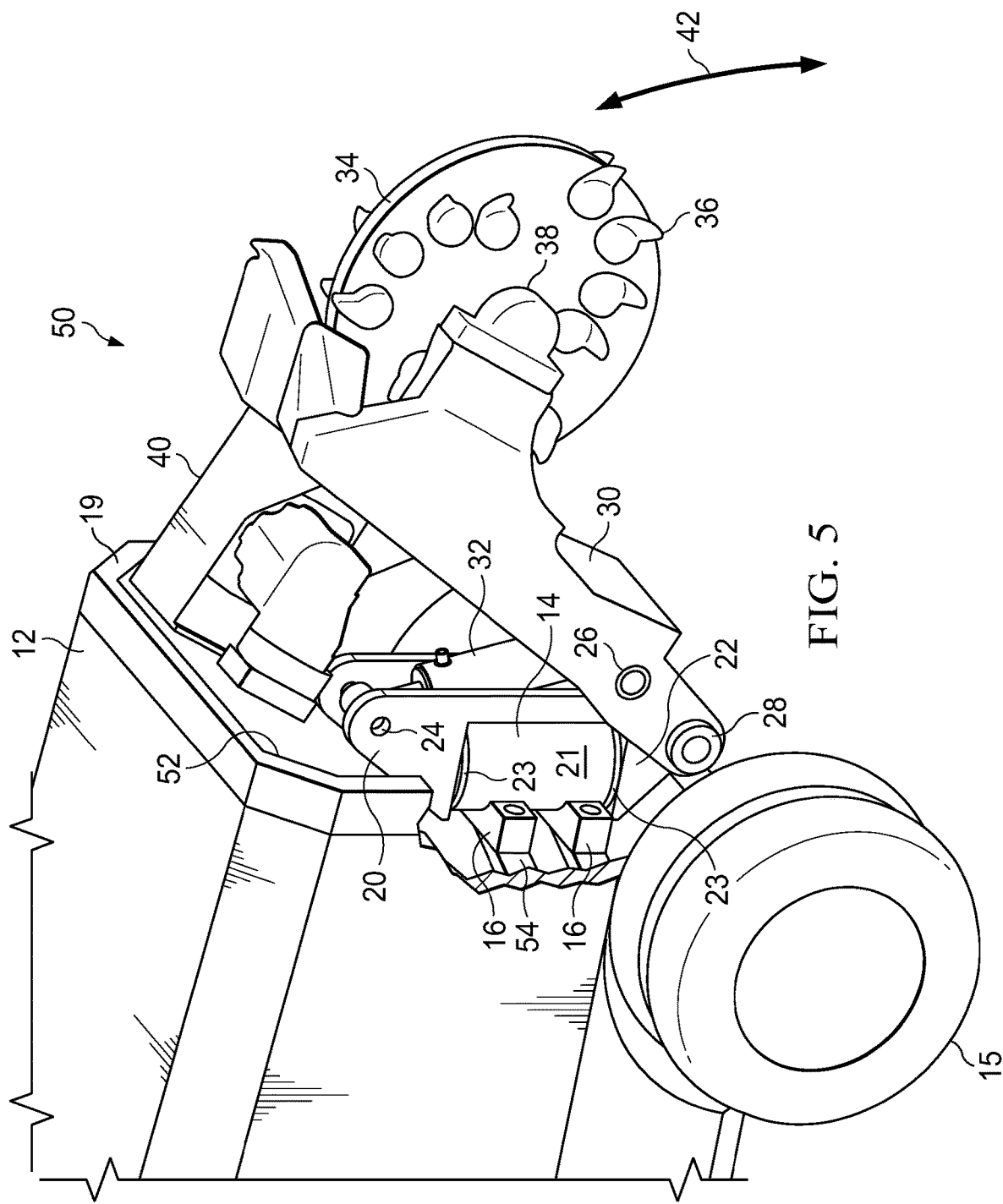
FIG. 5 is a perspective view of another embodiment of a stump grinder including a helical rotary actuator confined at least in part within a machine body.

In some embodiments, helical rotary actuator 14 may be partially or fully disposed within the machine body 12, such as by mounting the helical rotary actuator 14 to internal support structure 54 of the machine body 12, as shown in FIG. 5. For example, with reference to the stump grinder 50 shown in FIG. 5, the machine body 12 may include an outward facing wall 19 including an opening 52 sized so that helical rotary actuator 14 may be disposed, at least in part, within the machine body 12. In some of those embodiments, the machine body 12 may help to protect the helical rotary actuator 14 from flying debris and environmental corrosion, for example. Opening 52 may be sized and/or shaped so that the support 18 and arm 30 may be moved both up and down and from side to side without physical interference with the opening 52 or other components of the machine body 12. In some of those embodiments, mounts 16 may be directly connected to the machine's chassis providing for improved strength.

Figure 6:
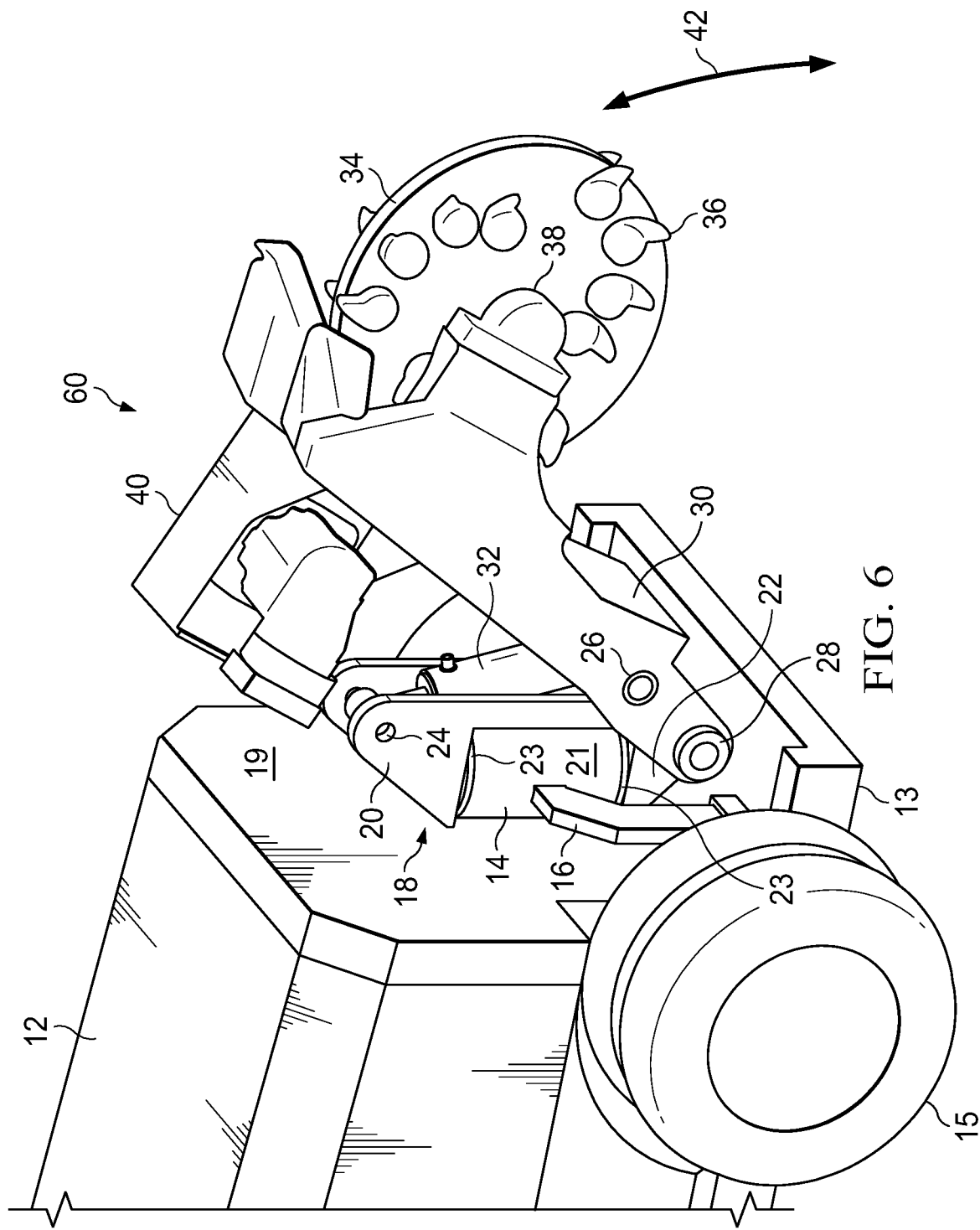
FIG. 6 is a perspective view of another embodiment of a stump grinder including a helical rotary actuator mounted over a chassis.
Figure 7:
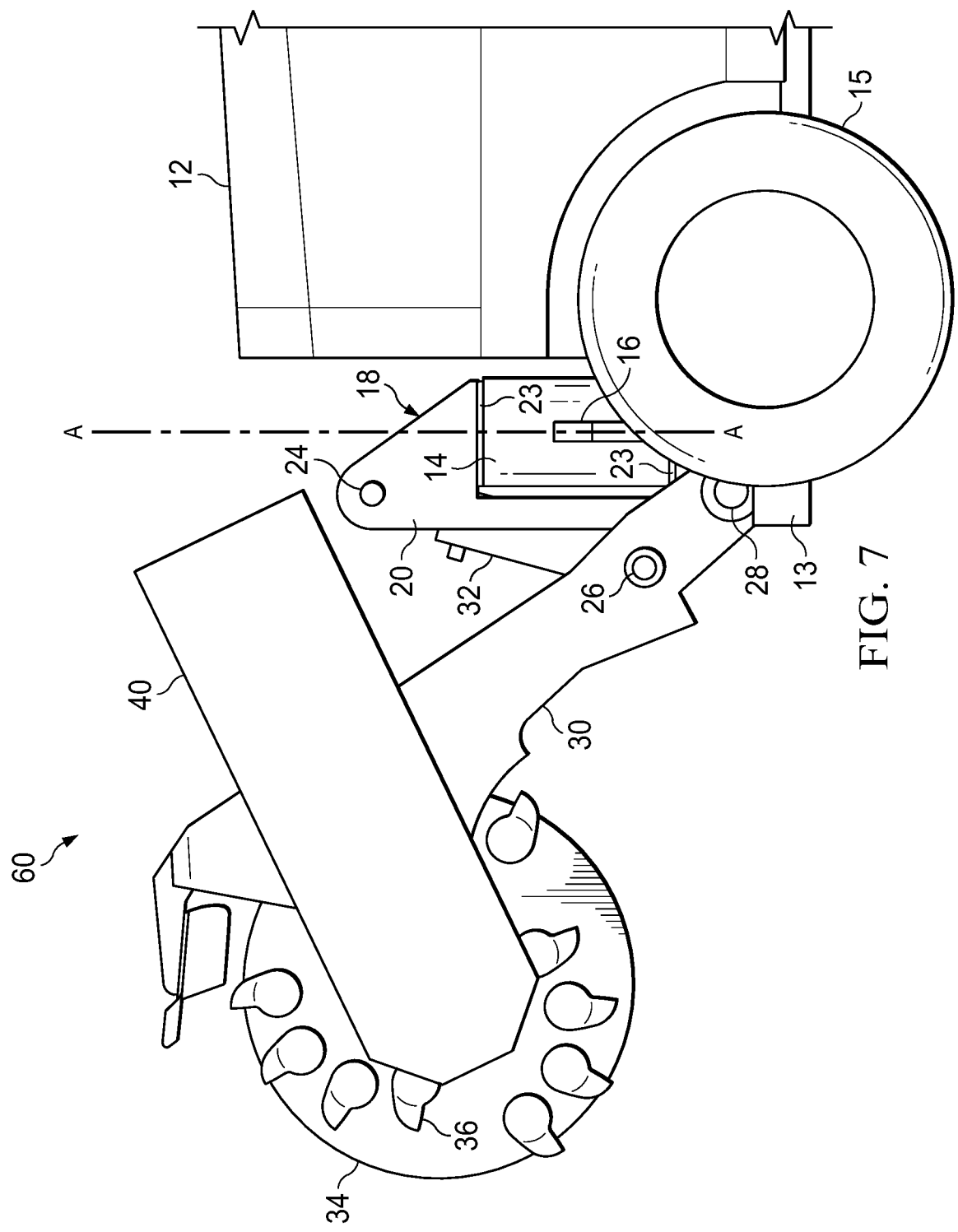
FIG. 7 is a left side elevational view of the stump grinder shown in FIG. 6.

FIG. 6 and FIG. 7 show another embodiment of a stump grinder 60. As shown in FIG. 6, one or more of the mounts 16 may be directly connected to the chassis 13 of the machine body 12. As best shown in FIG. 7, the central axis A-A may be positioned directly over the chassis 13 of machine body 12. For example, helical rotary actuator 14 may be positioned generally over an axle (not shown) extending between wheels 15 on the left and right sides of the stump grinder 60.

Persons of ordinary skill in the art will recognize that stump grinder 10, 50, 60 may be used to grind stumps or other wooden materials. Motor 40 may be operated to drive cutting wheel 34 in rotation, and arm 30 may be moved both up and down and from side to side to bring teeth 36 of cutting wheel 34 into contact with a stump or other wooden materials for grinding.

Persons of ordinary skill in the art will also recognize that some embodiments of a stump grinder as described herein may provide certain benefits. For example, in terms of performance, the swing path of the cutting wheel 34 may be dramatically increased due to the ability of helical rotary actuator 14 to provide substantially 180 degrees of swing range for arm 30. In some embodiments, with the central axis A-A of helical rotary actuator 14 located forward of machine body 12, the swing range of arm 30 may be greater than 180 degrees.

Additionally, in some embodiments, the weight distribution of stump grinder 10 may benefit from a shorter arm 30 because of the increased range of side to side movement from the helical rotary actuator 14. In terms of manufacturability, in some embodiments, the structure to support helical rotary actuator 14 may already exist in the frame of some stump grinder machines, and relatively few parts (e.g., a plurality of common hex head bolts) may be needed to mount helical rotary actuator 14 to machine body 12. In some embodiments, the number of critical tolerances among the components of stump grinder 10 may be substantially reduced or eliminated, and extensive or complex machining may be substantially reduced or eliminated. The reduced number of critical tolerances may also increase the reliability of the stump grinder. Also, in some embodiments, the helical rotary actuator 14 may be completely sealed and substantially maintenance free. Finally, the compact and simple design of the helical rotary actuator may allow various mounting locations on the machine body 12, thus improving manufacturability, operator visibility, and similar benefits. Also, the precision design of the helical rotary actuator may provide very predictable and complete swing path torque consistency and rigidity for the stump grinder. Other benefits may be realized as well.

Although the foregoing specific details describe certain embodiments of this invention, persons of ordinary skill in the art will recognize that various changes may be made in the details of this invention without departing from the spirit and scope of the invention as defined in the appended claims and other claims that may be drawn to this invention and considering the doctrine of equivalents. Among other things, any feature described for one embodiment may be used in any other embodiment, and any feature described herein may be used independently or in combination with other features. Also, unless the context indicates otherwise, it should be understood that when a component is described herein as being mounted or connected to another component, such mounting or connection may be direct with no intermediate components or indirect with one or more intermediate components. Therefore, it should be understood that this invention is not to be limited to the specific details shown and described herein.

What is claimed is:

1. A stump grinder comprising:
a machine body;
a helical rotary actuator mounted adjacent to said machine body, said helical rotary actuator comprising a central axis;
a support mounted to said helical rotary actuator, said support comprising an upper portion disposed at an elevation higher than said helical rotary actuator and a lower portion disposed at an elevation lower than said helical rotary actuator;
an arm mounted to said lower portion of said support;
a linear actuator pinned to said arm and pinned to said upper portion of said support, wherein said linear actuator is extendable and retractable for lowering and raising said arm;
a cutting wheel rotatably mounted to said arm; and
a motor operable for driving said cutting wheel;
wherein said helical rotary actuator is configured for moving said cutting wheel along an arcuate path about said central axis.

2. The stump grinder of claim 1 wherein said helical rotary actuator is mounted to said machine body using one or more mounts.

3. The stump grinder of claim 2 wherein said one or more mounts comprise at least one support bracket, arm, or plate.

4. The stump grinder of claim 1 wherein said helical rotary actuator is either bolted to said machine body or welded to said machine body.

5. The stump grinder of claim 1 wherein at least some of said upper portion of said support is disposed above said helical rotary actuator and at least some of said lower portion of said support is disposed below said helical rotary actuator.

6. The stump grinder of claim 1 wherein said motor is mounted to said arm.

7. The stump grinder of claim 1 wherein said motor is mounted to said machine body.

8. The stump grinder of claim 1 wherein said arm is pivotable about said central axis in a range of motion comprising substantially 180 degrees.

9. The stump grinder of claim 1 wherein said arm is pivotable about said central axis in a range of motion greater than 180 degrees.

10. The stump grinder of claim 1 said machine body being part of a vehicle including a vehicle chassis, wherein said helical rotary actuator is positioned above said chassis.

11. The stump grinder of claim 10 wherein said helical rotary actuator is mounted to said vehicle chassis.

12. A stump grinder comprising:
a machine body;
a helical rotary actuator mounted adjacent said machine body, said helical rotary actuator comprising a central axis;
a support mounted to said helical rotary actuator;
an arm mounted to said support, said arm being pivotable about said central axis in a range of motion of at least 180 degrees;
a cutting wheel rotatably mounted to said arm; and
a motor operable for driving said cutting wheel.

13. The stump grinder of claim 12 wherein said arm is pivotable about said central axis in a range of motion comprising substantially 180 degrees.

14. The stump grinder of claim 13 wherein said arm is no more than 1 foot to 5 feet in length.

15. The stump grinder of claim 12 wherein said arm is pivotable about said central axis in a range of motion greater than 180 degrees.

16. The stump grinder of claim 15 wherein said arm is no more than 1 foot to 5 feet in length.

17. The stump grinder of claim 12 wherein said helical rotary actuator is mounted directly to a chassis of said machine body.

18. A stump grinder comprising:
a machine body including a chassis;
a helical rotary actuator mounted to said machine body, said helical rotary actuator comprising a central axis, said helical rotary actuator being positioned above said chassis;
a support mounted to said helical rotary actuator;
an arm mounted to said support;
a cutting wheel rotatably mounted to said arm; and
a motor operable for driving said cutting wheel;
wherein said helical rotary actuator is configured for moving said cutting wheel along an arcuate path about said central axis.

19. The stump grinder of claim 18 wherein said helical rotary actuator is mounted directly to said chassis.

20. The stump grinder of claim 18 wherein said helical rotary actuator is at least partially disposed within said machine body.

21. A stump grinder comprising:
a machine body;
a helical rotary actuator mounted adjacent to said machine body, said helical rotary actuator comprising a central axis;
a support mounted to said helical rotary actuator;
an arm mounted to said support;
a cutting wheel rotatably mounted to said arm; and
a motor operable for driving said cutting wheel;
wherein said helical rotary actuator is configured for moving said cutting wheel along an arcuate path about said central axis; and
wherein said arm is pivotable about said central axis in a range of motion greater than 180 degrees.

* * * * *